United States Patent [19]
Pekar

[11] Patent Number: 5,372,487
[45] Date of Patent: Dec. 13, 1994

[54] INLET CHECK VALVE FOR PUMP MECHANISM

[75] Inventor: Robert W. Pekar, Florence, Mass.

[73] Assignee: Dielectrics Industries, Chicopee, Mass.

[21] Appl. No.: 74,372

[22] Filed: Jun. 10, 1993

[51] Int. Cl.⁵ .......................... F04B 43/00; A43B 7/14
[52] U.S. Cl. ................. 417/480; 137/512.15; 137/846; 36/29; 36/93
[58] Field of Search ............ 417/480; 36/29, 88, 36/93; 29/888.02; 137/512.15, 846, 849

[56] References Cited

U.S. PATENT DOCUMENTS

| | | | |
|---|---|---|---|
| 3,068,494 | 12/1962 | Pinkwater | 417/480 |
| 3,120,712 | 2/1964 | Menken | 36/29 |
| 3,133,696 | 5/1964 | Mirando | 417/480 |
| 4,546,555 | 10/1985 | Spademan | 36/29 |
| 4,674,532 | 6/1987 | Koyanagi | 137/512.15 |
| 4,708,167 | 11/1987 | Koyanagi | 137/512.15 |
| 4,850,912 | 7/1989 | Koyanagi | 137/512.15 |
| 4,917,646 | 4/1990 | Kieves | 446/224 |
| 4,995,173 | 2/1991 | Spier | 36/29 |
| 4,999,932 | 3/1991 | Crim | 36/88 |
| 5,074,765 | 12/1991 | Pekar | 417/480 |
| 5,144,708 | 9/1992 | Pekar | 5/454 |
| 5,222,312 | 6/1993 | Doyle | 36/29 |

*Primary Examiner*—Richard A. Bertsch
*Assistant Examiner*—Peter Korytnyk
*Attorney, Agent, or Firm*—Chapin, Neal & Dempsey

[57] ABSTRACT

An intake valve for use in a thermoplastic fluid pump for inflatable bladders in which the valve is composed of superposed elastomeric layers and one of which is energy sealed at the center thereof to an inner wall portion of the pump about an inlet opening through said layer. The inlet opening is axially aligned with a hole through said pump wall so that ambient air may upon an expansion stroke of the pump enter the valve through said inlet opening and hole in the pump wall. Thereafter when the pump is compressed, air within the pump chamber will seal the inlet opening and force said air into the bladder through a check valve provided therefor. Thereafter when the pump is released, air will again be drawn into the pump chamber through the intake valve.

12 Claims, 4 Drawing Sheets

INLET CHECK VALVE FOR PUMP MECHANISM

FIELD OF THE INVENTION

This invention relates to thermoplastic valves and more particularly, to such valves as are adapted to control fluid flow into the pumping chamber of a digitally operable pump.

BACKGROUND OF THE INVENTION

Digitally operable pumps with thermoplastic check valves are presently known in the relevant art for a variety of applications. One such pump is disclosed in my prior U.S. Pat. No. 5,144,708 (the '708 Patent) which is commonly used to inflate elastomeric bladders. As shown, an air inlet in the form of an outwardly facing air hole 22 is provided through an outer wall of a pump 28. The pump is operated by alternately compressing and releasing the outer wall of a pump chamber, filled with an open cell elastomeric material 14 and which, upon release of the compression force, is capable of expansion. For proper use of this type of digitally operable pump 28, it is necessary to cover the air hole 22 using one's thumb or finger during each compression stroke and to uncover the hole during each intake stroke whereby air will be alternately forced from the pump chamber into the bladder 30 and drawn through intake hole 22 during each expansion stroke. In normal operation, air cannot escape from the pump chamber through the intake hole 22 during compression because the user's thumb serves to seal the intake hole.

While pumps of such a configuration perform adequately in many applications, for other applications they have been found to have certain limitations. One such limitation relates to the fact that for each pump stroke, the inlet hole 22 must be controlled digitally and the pump will only operate properly if an air tight seal is formed over the inlet hole 22 during application of compressive force to the pump. Although this is normally not a daunting task, it may be more difficult to accomplish if the user is wearing gloves, such as is likely in cold weather conditions. Under such conditions, the user may find it awkward to use the pump while wearing gloves or uncomfortable to do so without gloves. The outwardly facing disposition of the air intake hole 22 has also been found unsuitable in cold weather applications, such as in inflatable ski boot liners when the ambient temperatures of the air out of door are frequently well below freezing. In such conditions, inflating the boot liner by pumping such cold air directly into one's boot liners will invariably result in chilling the wearer's feet at the start of a day of skiing.

Another drawback in the use of such pumps will occasionally occur when used in wet, slushy or dirty conditions in which wet, slushy snow or water may clog the inlet hole or enter the pump chamber through the exposed inlet hole so as to adversely affect the operation of the pump.

One solution to the problems associated with pumps such as those disclosed in my '708 Patent, is to relocate the air inlet opening and utilize an inlet check valve rather than an outwardly exposed inlet hole. In that connection, my U.S. Pat. No. 5,074,765 discloses a check valve 20 for use with a hand-operated pump for an inflatable bladder. The valve 20 is of a "flapper" type comprising a flexible portion or an elastically resilient dome 8 which operates in response to differential air pressure within and without the pump chamber. The valve is intended to prevent fluid, such as air from flowing out of the chamber during each compression stroke but will swing "open" to allow air to enter the chamber on the expansion stroke. The principal drawback of this valve construction is its relatively high manufacturing costs resulting from the material requirements of the structural strength and recovery resilience for effective operation of the pump dome. In addition, the construction of the valve 20 which is an integral part of the pump dome has been found less than totally satisfactory in sealing the pump chamber during compression of the dome.

DISCLOSURE OF THE INVENTION

It is a principal object of this invention to provide a simple, economical, and reliable intake and check valve and digitally operated pump combination fabricated almost entirely of low cost plastic sheet material.

Another object of this invention is to provide an intake valve and pump construction which overcomes the problems of the prior art pumps of the same type.

A further object of this invention is to provide an intake valve of the above construction which is of such simplicity as to be readily adaptable to simple and economical mass production manufacturing techniques.

According to this invention, a one-way check valve comprises pliable, superposed thermoplastic layers disposed within a thermoplastic pump. One layer is affixed to a wall of the pump and the valve has a centrally located intake opening therein which extends from a hole through an inner wall of the pump. The valve layers are attached together only at circumferentially spaced points to provide expansive air passages to maximize air intake into the pump during the fluid intake or expansion stroke and which readily close during the compression to prevent the reverse flow of air out of the pump chamber through the inlet opening.

The above and other objects and advantages of this invention will be more readily apparent from a reading of the following description of an exemplary embodiment thereof taken in conjunction with the following drawings.

DETAILED DESCRIPTION OF THE PREFERRED EMBODIMENT

Figure 1:
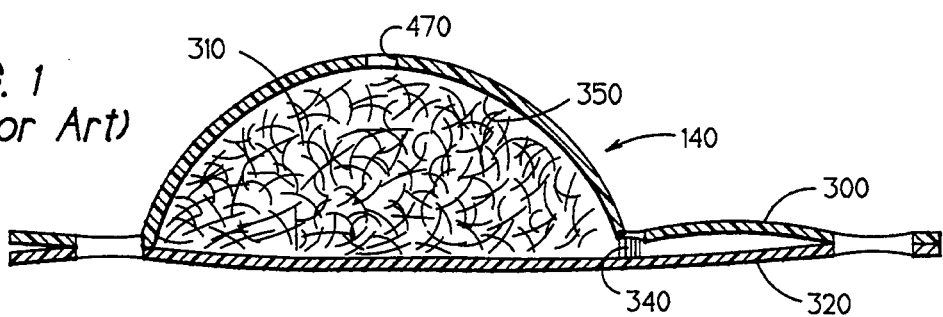
FIG. 1 is a cross-sectional elevational view of a digitally operable plastic pump of the prior art.

Referring to FIG. 1, a thermoplastic pump 140 of the prior art comprises upper and lower layers 300 and 320 combined to form the walls of a pump chamber 350 therebetween. Elastomeric foam 310 is disposed in the chamber and an output passage 340 leads to an output cheek valve (not shown) which may be of similar type to that shown at 30 in my prior U.S. Pat. No. 5,144,708 and which is also represented at 18 in FIG. 2. The pump 140 also includes an inlet hole 470 through a spherical dome portion of the upper layer 300. The pump 140 is used by alternately compressing and releasing the upper layer wall 300 digitally so that upon expansion of the open cell foam material 310, air will be drawn through the hole 470. In order for the pump 140 to operate properly, one must alternately cover and uncover the hole 470 using one's thumb or finger during each compression stroke and release or uncover the hole during each expansion and expansion stroke of the pump.

Figure 2:
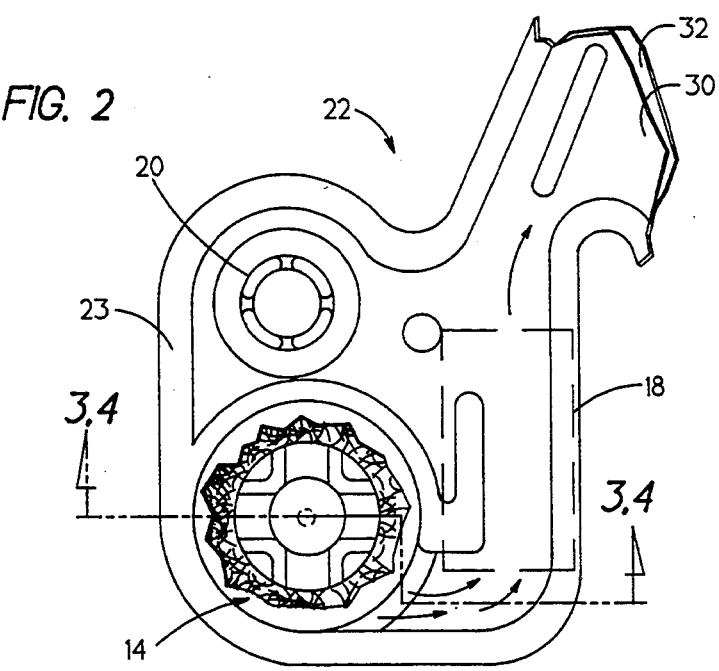
FIG. 2 is a partial plan view of a fluid pump and inflatable bladder in combination with a thermoplastic check valve of the type embodying this invention and with portions broken away to show interior constructional features thereof.

In FIGS. 2–4 and 10, a thermoplastic pump 14 embodying this invention, generally similar to thermoplastic pump 140, further comprises a polymeric intake check valve 16 and as shown in FIG. 2, it includes an outlet check valve 18. The outlet check valve 18 and an exhaust valve 20 may be of the type disclosed in my U.S. Pat. No. 5,144,708 (the '708 Patent) which is hereby incorporated by reference. The pump assembly 10 is shown integrally associated with a bladder 22 which may be selectively inflated by the pump 14 and deflated by air release valve 20.

Figure 3:
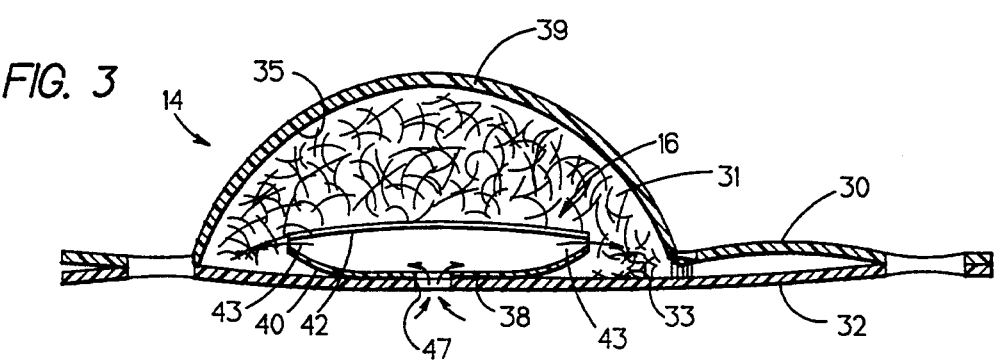
FIG. 3 is a cross-section, on an enlarged scale, taken along 3—3 of FIG. 2 illustrating the pump in its expansion stroke.
Figure 4:
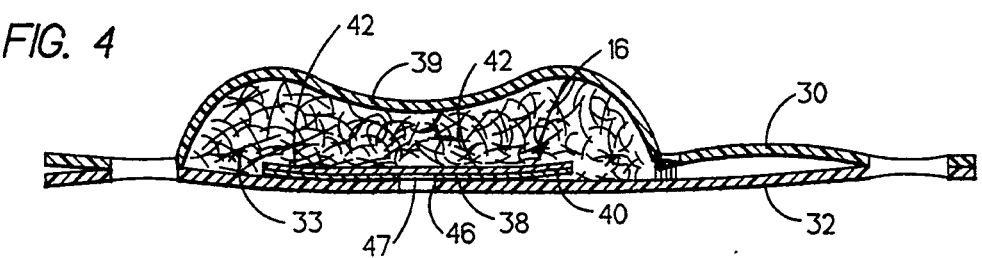
FIG. 4 is a view similar to FIG. 3 illustrating the pump in its compression stroke.
Figure 10:
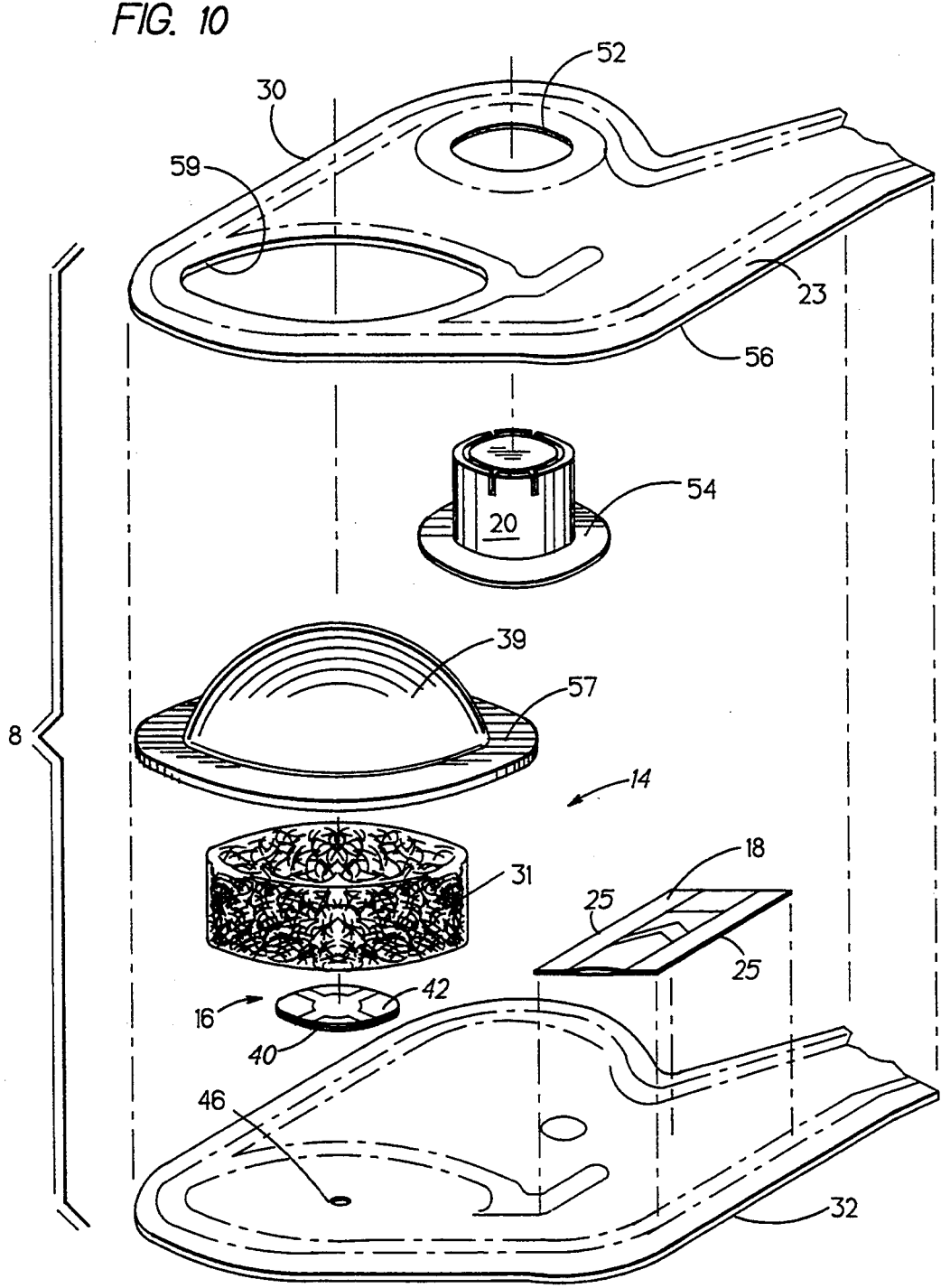
FIG. 10 is an exploded perspective view illustrative of the method of fabrication of the pump and bladder combination of FIG. 2.

As best shown in FIGS. 3, 4 and 10, pump 14 comprises upper and lower walls or layers 30 and 32 respectively, which may be thermoplastic sheet material such as polyurethane or polyvinylchloride mid may range in thickness from about 0.005 to 0.050 inch to form pump chamber 35 and the associated inflatable bladder 22 sealed about its peripheral edge 23. The upper layer 30 includes a preformed semi-spherical dome portion 39 having a lower edge portion in the form of an outwardly extending flange 57 (FIG. 10). An open cell elastomeric foam material 31 is disposed between the inner surface of the dome 39 and the opposed upper surface portion 33 of the lower layer 32 and generally fills the full volume of the pump chamber 35, as shown in its expanded condition (FIG. 3). The intake valve 16 is disposed wholly within the pump chamber and as will best be seen in FIG. 3, is secured, as at 38, to the lower wall portion 33 of the pump chamber 35 to receive fluid through the hole 46 in the lower wall portion of pump chamber 35.

In one application, the pump chamber 35 may have a volume of approximately 0.5 to 1.5 cubic inches although the volume may vary for other applications. The flange 57 of dome 39 (FIG. 10) is adapted to be bonded or fused as by heat sealing or the like between the peripheral edge portion 59 of the upper layer or sheet 30 of the bladder 22 about the perimeter of the cutout 59. Upper plastic layer 30 is also provided with a cutout 52 for ease of assembly of the exhaust valve 20 which has a thermoplastic flange 54 may be fused to the peripheral portion 52 of the layer 30.

As shown in FIGS. 3, 4 and 10, in the preferred embodiment, the lower wall portion 32 of the pump 14 is defined and provided by the portion of the lower layer 32 of the bladder 22 within the pump chamber 35. Hole 32 through the lower wall 32 is generally located at the geometric center of the lower wall of the pump chamber 35.

Figure 8:
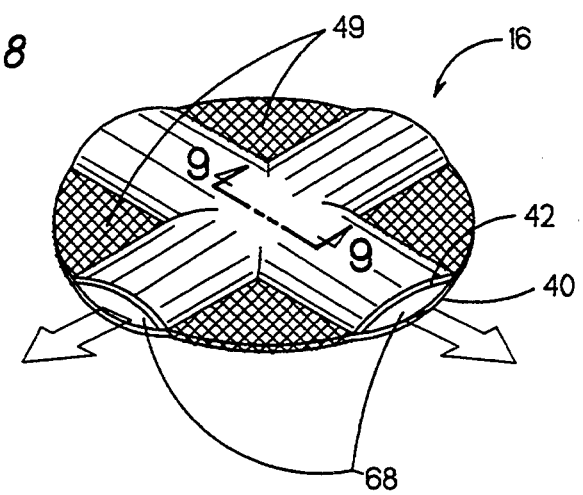
FIG. 8 is a perspective view on an enlarged scale of the valve in its form which illustrates the valve in one of its operative conditions.

As will be seen in FIGS. 3–4, 8 and 9, the check valve 16 comprises superposed lower and upper layers 40 and 42 respectively, each provided by a unitary pliable thermoplastic film and which are sealed together at circumferentially spaced locations as at 49 (FIG. 8).

Figure 5:
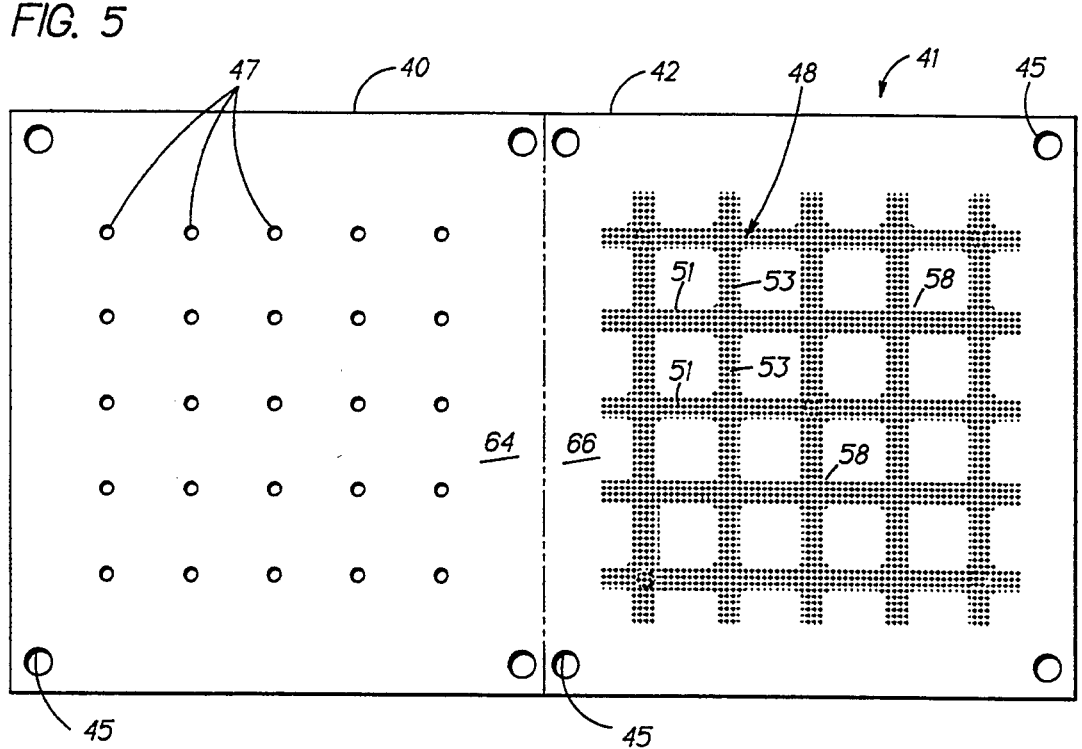
FIGS. 5 and 6 are perspective views showing steps in a preferred method of fabricating the plastic check valve of this invention.
Figure 6:
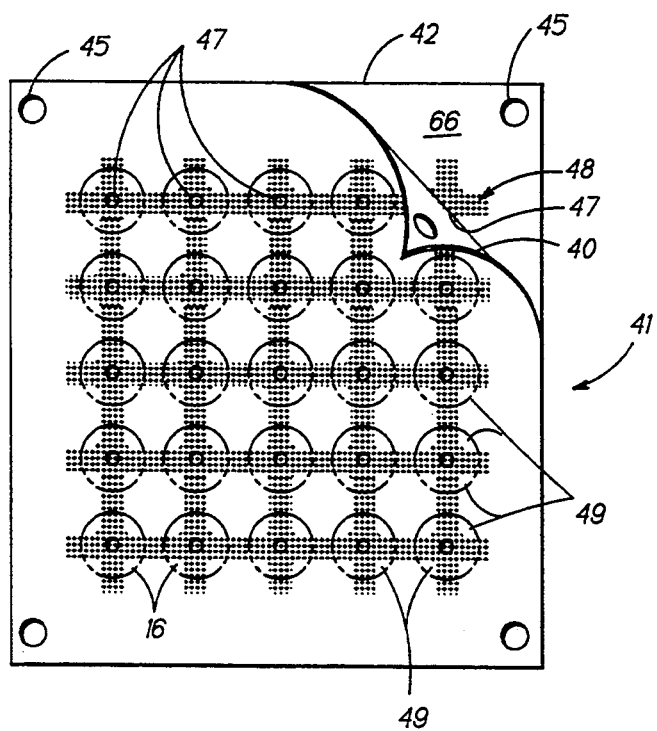

The preferred method of fabricating the valve 16 is best illustrated in FIGS. 5 and 6. Referring now to FIG. 5, the lower and upper layers 40 and 42 respectively of the intake valve 16 are formed from a unitary sheet 41 of a suitable thermoplastic film which may be of the same material as the pump 16 but of substantially lesser thickness, i.e., a film in the range of 0.001 to 0.015 inch to ensure maximum pliability, flexibility and pressure responsiveness of the valve while still being highly energy sealable and durable to serve its intended function. The method comprises the steps of forming a score line 43 transversely across the middle of a unitary sheet 41 of the thermoplastic film. The sheet is shown as having been provided with a plurality of registration holes 45 generally adjacent each of the corner portions of the sheet 41 and adjacent the upper and end portions of the score line 43 for registration of the sheet 41 and each half portion thereof relative to the tooling used in the processing steps.

In FIG. 5, release material 48 is shown as having been deposited by common silk screening technique in an overall grid pattern onto one-half portion 42 of the sheet 41. On the other half portion 40 of the sheet 41, a plurality of holes 47 are provided in spaced apart relation so that when the sheet 41 is folded upon itself along its score line 43, as shown at FIG. 6, each hole 47 will be adapted to register with the geometric center of each hub portion 58 at the intersection of the horizontal and vertical bar portions 51 and 53 respectively, which form the grid pattern of the release material 48.

The barrier material or release coating 48 is applied to the upper surface 66 of sheet 42 which is the right-hand portion of sheet 41, as shown in FIG. 5. The release material 48 is applied in sufficient thickness and to cover a sufficient area to prevent heat sealing or R.F. energy sealing together of the so-coated layers 40 and 42 during the heat sealing operations associated with the assembly of the intake valve 16 and pump 14. Indeed, such sealing is prevented even though those areas of the two films are disposed in registered, superposed and abutting relationship, as in FIG. 6 and are subjected to sufficient energy and pressure so that any uncoated surface portions of the sheets 40 and 42 will be permanently fused or sealed together along the abutting, uncoated areas 49 thereof. Preferably, the coating is applied as a composition in a liquid dispersion medium of an organic solvent or water base with a dispersed phase of finely divided microscopic particles, on the order of five (5) microns in diameter, of a polyethylene, a polytetrafluoroethylene (Teflon) or silicone as is disclosed in the above referenced '708 Patent.

After the release coating has been applied to the portion 42 of the sheet 41, the sheet will be folded and disposed in a fixture, not shown, in which a plurality of valves are formed by bonding or fusing the two layers together in a multi-element sealing die except those portions coated by the release material 48. The folded and fused sheet 41 is then cut in a cutting die having circular or polygonal shaped cutters located to cut out each valve about a periphery generally concentric with the holes 47 to form a plurality of valves 16 simultaneously, as shown in FIG. 8.

Figure 7:
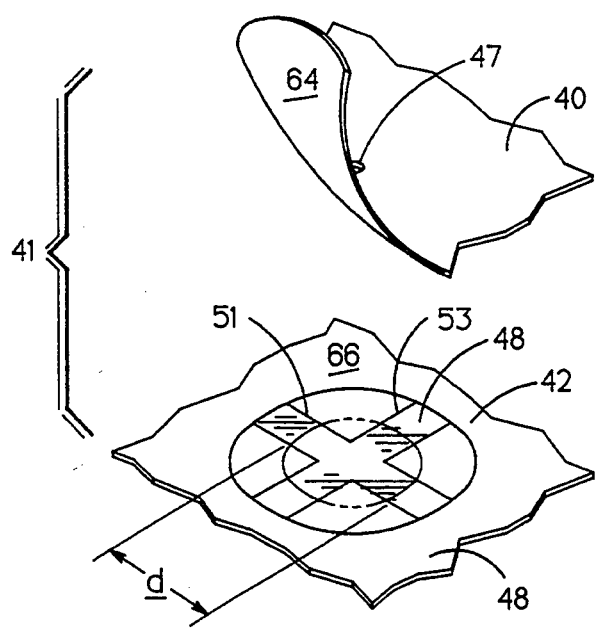
FIG. 7 is a partial exploded perspective view which illustrates a stage in the construction of the plastic check valve of this invention.

It has been found that intake valves 16 having an overall outer diameter d (FIG. 7) of approximately ⅝ inch will result in suitable performance characteristics for most applications of these valves. As will also be seen in FIG. 7, the release coating 48 is applied onto surface 66 of what will be the upper layer 42 of the valve 16. It will also be noted that the release pattern 48 extends over a greater area than the final outer diameter d of the intake valve per se, thus providing for the fabrication of valves of varying diameter. The pattern also preferably includes four equally spaced quadrants, zones or wedge-shaped sectors 49, each of which is disposed between adjacent of the radially extending bar portions 51 and 53 which form the generally cruciform release pattern 48. The valve 16 is characterized by a generally central chamber 67 and a plurality of branch channels 68 (FIGS. 8 and 9), to selectively accommodate the inflow of fluid upon expansion of the dome portion 39 of the pump and of the open cell foam 31 in the pump chamber and upon each compression stroke, to close off and seal the axially aligned opening 46 and hole 47 of the valve and pump.

Figure 9:
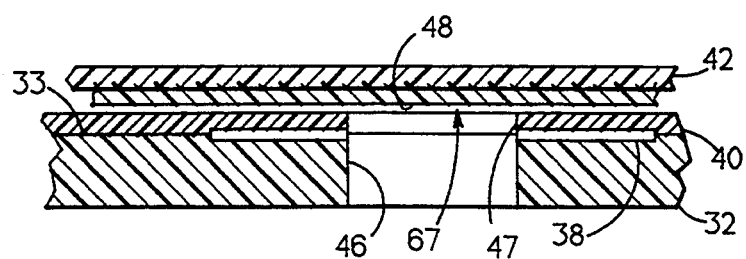
FIG. 9 is a section on an enlarged scale, taken along line 9—9 of a perspective view of the valve shown in FIG. 8 in another of its operative conditions.

When the valve 16 has been formed, as described above, it is ready for installation into a pump assembly and bladder 22, as depicted in FIGS. 2 and 10, the first step is to secure valve 16 with its inlet opening 47 in axial alignment with the hole 46 through the pump wall 33, as illustrated in FIG. 9. This may be done by placing sheet 32 onto the upper surface of a sealing die and registering a template thereon (not shown) configured with cutouts to locate accurately the valve 16 on the surface 33 of sheet 32 with its inlet opening 47 in axial alignment with the hole 47 through sheet 32. An upper sealing die (not shown) may then be used to form the peripheral seal 23 arid to seal about the exhaust valve 20, dome 39 with the foam 31 disposed therein and along the side edges 25 of the check valve 18 to fabricate the bladder 22 and at the same time, integrate therewith the other components shown in FIG. 10. Sealing or fusing the layers 30 and 32 as described in this manner will produce a sealed pump 14 and a sealed inflatable bladder 22 in which the only passage for air flow from the pump chamber 35 into the bladder is through check valve 18 similarly, the only passage by which air may enter the bladder is through the check valve 16.

As discussed above, the release coating 48 on face 66 of the intake valve 16 will prevent the opposed inner surfaces from becoming fused to one another during this heat sealing operation. In addition, the surface of the inner layer 42 of the valve 16 which is exposed through the holes 46 and 47, as best illustrated in FIG. 9, is coated with release material 48 so that it will be characterized by its low blocking tendency or its adherence to other surfaces with which it is likely to come into contact during operation of the pump with inlet opening facing downwardly. This is important in the operation of the pump since the air inlet holes 46 and 47 are generally oriented inwardly when the pump is being operated and the lower surface of the pump wall 32 will be pressed against some other surface layers, such as the tongues of athletic shoes or ski boots, socks worn by the user or possibly a bandage or the like. Under such circumstances, because of the release coating 48 on its inner surface 42 (FIG. 9), the valve will have a minimal tendency to stick or adhere to such surfaces which would of course have an adverse affect on the operation of the check valve 16 which depends upon free movement of the film 42 relative to the film 40.

To operate the pump 14, the user will alternately compress and release the upper wall 39 of the pump 14 using his or her thumb or forefinger. With each compression stroke, air will be expelled from the pump chamber 35 and from the open cell foam 31 to inflate the bladder 22. Since the two layers 40 and 42 of the valve will be pressed together during the compression stroke, as shown in FIG. 4, the only outlet for the air into bladder 22 will be through check valve 18. Because of the elastic nature of the open cell foam 31 within the pump chamber 35 and the resilience of the spherical dome 39, when the digital pressure on the dome 39 is released, the dome will return to its original shape, creating a partial vacuum in chamber 35 to draw air into the dome through the inlet opening 47 and the hole 46. The foam 31 disposed in the pump chamber will also expand to its uncompressed state, as shown in FIG. 3 and in doing so, will fill with air. When the pump chamber 35 has fully expanded, the elastomeric foam 31 will cause the upper surface layer 42 of the valve to be pressed against the lower layer 40 thereof, thus closing the inlet opening 47 of the valve to prevent air flow in the reverse direction. As the user presses inwardly on the pump dome 39, as in FIG. 4, air pressure and the pressure of the foam itself will cause the upper layer 42 to be pressed firmly against the lower layer 40 of the intake valve 16 in intimate surface-to-surface contact to close off the inlet opening 47 of the valve.

The construction of the valve 16 has advantages in addition to its simple and economical construction over prior valves. For example, because of the construction of the valve as well as its location and orientation within the pump chamber, air pressure within the pump chamber 35 acts on both valve films 40 and 42 and the foam 31 acts on the valve film 42 to increase substantially sealing forces thereon during each compression stroke. In this connection, moreover, the valve being fabricated of two very thin films will be more responsive to fluid pressure changes occurring in the pump chamber.

A further operational benefit of the generally circular configuration of the valve 16 is that during the expansion stroke, air is rapidly drawn into the pump through the center holes 46 and 47 and distribute the air omnidirectionally into the four quadrants or pump chamber 35.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. In combination with a fluid pump having a digitally compressible pump chamber, a check valve disposed in said pump chamber comprising at least two pliable films of synthetic plastic material disposed in superposed relation and having opposed inner surfaces, one of said films having a fluid inlet opening therethrough, said films being sealed together at circumferentially spaced locations outwardly of said inlet opening to define a central fluid chamber with a plurality of branch channels for unidirectional flow of fluid from said inlet opening of the valve into said pump chamber.

2. In combination with a fluid pump having a digitally compressible pump chamber, a check valve as set forth in claim 1, wherein said inlet opening extends generally centrally through one of said films.

3. In combination with a fluid pump having a digitally compressible pump chamber, a check valve as set forth in claim 2, wherein at least one of said films includes a release coating disposed on the inner surface thereof corresponding to the central chamber and said branch channels of said release coating to prevent the energy sealing together and blocking of said films over the area coated with the release material.

4. In combination with a fluid pump having a digitally compressible pump chamber, a check valve as set forth in claim 3, wherein said release material is disposed on the inner surface of said film in a cruciform pattern that is opposite the film in which said inlet hole is provided.

5. In combination with a fluid pump having a digitally compressible pump chamber, a check valve as set forth in claim 4, wherein said pump comprises a pump chamber in which is disposed an open cell, elastomeric foam material and a hole is provided into said pump chamber comparable to said inlet opening of the valve and being adapted to be disposed in registered relationship therewith.

6. In combination with a fluid pump having a digitally compressible pump chamber, a check valve as set forth in claim 5, wherein said pump comprises at least two sheets of thermoplastic material, one of said sheets including a resiliently flexible dome portion disposed in spaced relation to a portion of the second sheet to form said pumping chamber and in which said hole is provided through the second sheet and in which said valve is adapted to be secured about the hole and with its inlet opening in axially registered relation with .said hole.

7. In combination with a fluid pump having a digitally compressible pump chamber, a check valve as set forth in claim 6, wherein a first film is the one in which said inlet opening is provided and a second film is the one on which said release material is deposited, said first film being sealed to the sheet forming the pump chamber opposite said dome with said inlet opening disposed in registered relation with said hole; to enable fluid flow into said pumping chamber and said second film facing the inlet opening so that said release material is disposed on the surface of said valve opposite said hole and opening and said foam fills substantially the volume of said pump chamber so that during each compression stroke of the pump the second films is urged into surface-to-surface engagement with the first film in fluid sealing relationship by said foam and the air pressure within the pump chamber.

8. In combination with a fluid pump having a digitally compressible pump chamber, a check valve as set forth in claim 7, when said films have a thickness substantially less than that of the sheets which form the pump chamber for rapid response to pressure changes in said pump chamber.

9. A check valve for use with a fluid pump comprising at least two pliable films of synthetic plastic material disposed in superposed relation and having opposed inner surfaces, one of said films having a fluid inlet opening therethrough, said films being sealed together at circumferentially spaced locations outwardly of said inlet opening to define a central fluid chamber with a plurality of branch channels extending radially therefrom for the unidirectional flow of fluid from said inlet opening of the valve into said pump.

10. A check valve for use with a fluid pump as set forth in claim 9, wherein said inlet opening is located generally centrally of one of said films and wherein a release coating is disposed on the inner surface of the other of said films to prevent energy sealing together and blocking of said films over the area coated with said release material.

11. A check valve for use with a fluid pump as set forth in claim 10, wherein the release material is disposed on the inner surface of said film in a cruciform pattern having its geometric center generally disposed in opposed alignment with the inlet opening extending through the other film.

12. A check valve for use with a fluid pump as set forth in claim 11, in which said films art: sealed together radially outward of the inlet opening and in circumferentially spaced relation to define channels for the one way flow of fluid from the inlet opening into the chamber of said fluid pump.

* * * * *